(12) United States Patent
Bandyopadhyay et al.

(10) Patent No.: US 10,075,339 B2
(45) Date of Patent: Sep. 11, 2018

(54) GENERIC DEVICE ATTRIBUTES FOR SENSING DEVICES

(71) Applicant: Tata Consultancy Services Limited, Maharashtra (IN)

(72) Inventors: Soma Bandyopadhyay, West Bengal (IN); Abhijan Bhattacharyya, West Bengal (IN); Munmun Sengupta, West Bengal (IN)

(73) Assignee: TATA CONSULTANCY SERVICES LIMITED (IN)

( * ) Notice: Subject to any disclaimer, the term of this patent is extended or adjusted under 35 U.S.C. 154(b) by 617 days.

(21) Appl. No.: 14/365,352

(22) PCT Filed: Dec. 10, 2012

(86) PCT No.: PCT/IN2012/000809
§ 371 (c)(1),
(2) Date: Jun. 13, 2014

(87) PCT Pub. No.: WO2013/102927
PCT Pub. Date: Jul. 11, 2013

(65) Prior Publication Data
US 2014/0379878 A1    Dec. 25, 2014

(30) Foreign Application Priority Data
Dec. 13, 2011 (IN) .......................... 3503/MUM/2011

(51) Int. Cl.
*H04L 12/24* (2006.01)
*H04L 29/08* (2006.01)
(Continued)

(52) U.S. Cl.
CPC .......... *H04L 41/0823* (2013.01); *H04L 41/12* (2013.01); *H04L 67/12* (2013.01);
(Continued)

(58) Field of Classification Search
CPC ............. H04L 12/2803; H04L 12/2807; H04L 12/2809; H04L 12/281; H04L 41/0803;
(Continued)

(56) References Cited

U.S. PATENT DOCUMENTS 6,859,831 B1    2/2005 Gelvin et al.
7,299,160 B2 *  11/2007 Hamdan ............... H04L 69/329
                                                    702/188
(Continued)

OTHER PUBLICATIONS

Abbasi et al., "A survey on clustering algorithms for wireless sensor networks", Computer Communications, vol. 30, No. 14-15, Oct. 2007, pp. 2826-2841.*
(Continued)

*Primary Examiner* — Vivek Srivastava
*Assistant Examiner* — William C McBeth
(74) *Attorney, Agent, or Firm* — Hayes Soloway P.C.

(57) ABSTRACT

A method and system is provided for optimizing time and complexity during an interoperation of at least two smart sensing device's operating in a heterogeneous environment, each device is configured to predetermined characteristics for a heterogeneous environment with a dynamic degree of prioritization in interoperation. The said method and system is adapted for creation of generic device attributes for smart sensing devices by an edge gateway system during the device discovery phase and at the same time performing semantic analysis on the content of the attributes to optimize the device interoperation mechanism in any smart environment.

17 Claims, 3 Drawing Sheets

(51) Int. Cl.
*H04L 29/06* (2006.01)
*H04L 12/28* (2006.01)

(52) U.S. Cl.
CPC ............ *H04L 67/16* (2013.01); *H04L 67/303* (2013.01); *H04L 69/24* (2013.01); *H04L 12/2807* (2013.01)

(58) Field of Classification Search
CPC ............ H04L 41/0806; H04L 41/0823; H04L 41/0889; H04L 41/0893; H04L 41/12; H04L 67/12; H04L 67/16; H04L 67/303; H04L 69/24
See application file for complete search history.

(56) References Cited

U.S. PATENT DOCUMENTS

| | | | | |
|---|---|---|---|---|
| 7,937,167 | B1* | 5/2011 | Mesarina | H04W 8/186 340/870.11 |
| 8,437,378 | B2 | 5/2013 | Picard et al. | |
| 8,631,063 | B2 | 1/2014 | Helal et al. | |
| 9,667,671 | B2* | 5/2017 | Raajaratnam | H04L 65/1069 |
| 2005/0152288 | A1* | 7/2005 | Datla | H04L 41/0613 370/256 |
| 2006/0165040 | A1 | 6/2006 | Rathod et al. | |
| 2006/0173985 | A1 | 8/2006 | Moore | |
| 2008/0195584 | A1* | 8/2008 | Nath | G06F 17/30864 |
| 2008/0270579 | A1 | 10/2008 | Herz et al. | |
| 2012/0109872 | A1* | 5/2012 | Havinga | H04L 67/125 706/52 |
| 2013/0311558 | A1* | 11/2013 | Kim | H04L 67/12 709/204 |
| 2014/0241354 | A1* | 8/2014 | Shuman | H04L 67/16 370/390 |
| 2014/0244834 | A1* | 8/2014 | Guedalia | H04L 67/16 709/224 |
| 2016/0013966 | A1* | 1/2016 | Vaidyanathan | H04L 41/02 709/223 |

OTHER PUBLICATIONS

Bandyopadhyay et al., "Architecture Supporting Discovery adn Management of Heterogeneous Sensors for Smart System Using Generic Middleware", International Journal of Computer Networks & Communications, vol. 4, No. 5, Sep. 2012, pp. 131-147.*
Gurgen et al., "SStreaMWare: a Service Oriented Middleware for Heterogeneous Sensor Data Management", Proceedings of the 5th International Conference on Pervasive Services, Jul. 6-10, 2008, pp. 121-130.*
Tilak et al., "A File System Abstraction for Sense and Respond Systems", Proceedings of the 2005 Workshop on End-to-End, Sense-and-Respond Systems, Applications and Services, Jun. 5, 2005, pp. 1-6.*
Cassar, "A Hybrid Semantic Matchmaker for IoT Services", 2012 IEEE International Conference on Green Computing and Communications, 2012, pp. 210-216.*
Hong, "A Resource-Oriented Middleware Framework for Heterogeneous Internet of Things", 2012 International Conference on Cloud and Service Computing, 2012, pp. 12-16.*
Konstantinos et al., "Aligning smart and control entities in the IoT", Internet of Things, Smart Spaces, and Next Generation Networking, 2012, pp. 39-50.*
Kotis et al., "Semantic Interoperability on the Web of Things: The Semantic Smart Gateway Framework," 2012 Sixth International Conference on Complex, Intelligent, and Software Intensive Systems, 2012, pp. 630-635.*
Alam et al., "A Semantic Enhanced Service Proxy Framework for Internet of Things", 2010 IEEE/ACM International Conference on Green Computing and Communications & International Conference on Cyber, Physical and Social Computing, Dec. 2010, pp. 488-495.*
Huang et al., "Semantic Sensor Information Description and Processing", 2008 Second International Conference on Sensor Technologies and Applications, 2008, pp. 456-461.*
Sheth et al., "Semantic Sensor Web", IEEE Internet Computing, vol. 12, No. 4, Jul.-Aug. 2008, pp. 78-83.*
Soma Bandyopadhyay, Munmun Sengupta, Souvik Maiti and Subhajit Dutta "Role of Middleware for Internet of Things: A Study" International Journal of Computer Science & Engineering Survey (IJCSES) vol. 2, No. 3, Aug. 2011 Innovation Lab, TATA Consultancy Services Ltd. Kolkata, India.
Ke Wang, Salma Abu Ayyash, Thomas D.C. Little, "Attribute-Based Clustering for Information Dissemination in Wireless Sensor Networks" MCL Technical Report No. Jul. 13, 2005.

* cited by examiner

GENERIC DEVICE ATTRIBUTES FOR SENSING DEVICES

FIELD OF THE INVENTION

The present invention relates to the field of ubiquitous computing and Internet of Things. More particularly, the invention relates to system and method for creating generic device attributes (GDA) structure of the smart sensing devices during device capability negotiation of device discovery and optimizing device prioritization and interoperation of at least two smart heterogeneous sensing devices in a smart environment.

BACKGROUND OF THE INVENTION

It is widely believed that the emergence of ubiquitous computing and sensor networks, will effectuate a gradual elimination of personal computing. This will have profound impacts on how networked and connected systems work today. Particularly, smart environment architecture and components level interoperation in such environment may alter.

In the smart environment architecture, as is known a Pervasive awareness systems (PASs) collect awareness information from sensors and devices and present it to remote users by using awareness objects such as ambient displays, lamps and picture frames. Such systems typically modeled with a pervasive awareness management framework for supporting the conception, design and realization of applications that foster discovery, connectedness between user and devices.

In such smart environment architecture, device discovery enables extraction of information from the devices according to their characteristics. Hitherto, various systems and methods are provided for performing a device discovery and predominantly for addressing problems associated with an efficient device discovery. However, following the discovery, an ability of a smart system for prioritization and interoperations there between the devices is not disclosed in the art. An effective prioritization results in an optimized interoperation between devices, which collectively enhances the quality of user experience related with the devices. In turn, user friendly PASs allow users as well as applications to discover and interact with the most appropriate and relevant services provided by many devices/sensors in the environment.

In a smart environment the devices are configured to function according to the attributes of the devices, as services in any smart space are registered and looked up by their attributes.

A challenge is also faced in effective device prioritization and optimization of device interoperation while performing device capability negotiation during device discovery. Various discovery mechanisms have been proposed, designed, and implemented. While they share the main goal of providing a mechanism for service association and discovery of the devices, they vary significantly in aspects like the architectural design and working environment (i.e., LANs, mobile ad hoc, Internet). Current discovery protocols, such as Jini, UPnP, Salutation, SLP, Ninja/SDS, INS/Twine, and UDDI, are not suitable for pervasive computing environments.

The situation based applications known in the art are modeled with a predefined set of contexts, and hence are not dynamic. Accordingly, these applications do not consider contextual information in a flexible manner while discovering services, and as a result, they fail to provide the most relevant and appropriate services for users, hampering user experience.

To achieve more flexible situation awareness, the applications should have the ability to discover smart sensing devices with a complete understanding of their attributes and collect sensing data in a timely and organized fashion.

In addition to sensing physical surroundings in the context-aware systems, an efficient processing of data collected from sensors is still a challenge. As while data processing, complexities arise for resolution of attributes such as location, identity, timestamp, etc. and even more for representation of these resolved attributes during actual communication with the sensor.

There are conventional systems that exist to associate device descriptors with the discovered devices using different discovery protocol. The conventional systems teaches about a method for target discovery in an iSCSI storage area network in which the host initiator uses a target discovery manager which communicates with the target devices through a network. This system may provide a clear way to map host side enumerations of target devices to different iSCSI discovery protocols. However, this system takes into account the discovery protocol and its prioritization only for later device interaction. It does not facilitate choosing the right sort of devices for a given type of exchange for later interaction.

Another conventional system may associate unified device descriptors (UDD) by analyzing and discovering electronic documents in an intranet using semantic analysis. Intranet includes multiple web sites. This system emphasizes on the electronic files in the intranet, it deals with the data content of the files, the type of files can be html or non-html based thus the system does not state about smart devices, here the electronic files are considered as devices and also does have to address much of heterogeneity.

Another conventional system may provide a method and system for customized data delivery and network configuration by performing the aggregation of device attributes using a specific network architecture having multiple access gateways. However it does not propose any method, system and devices for achieving faster interoperation between the devices.

Some of the prior art as discussed above teaches device discovery, device attributes, semantic analysis, device interoperation, and associating uniform device descriptor file with digital device of the set of digital devices operating in a networked environment. The systems in the state of the art are not precisely aware of any mechanism of generating generic device attributes of devices in a smart environment during the device discovery process to help to reduce the time and complexity in device prioritization and device interoperation for a required type of interaction.

Thus, a heretofore unaddressed need exists in the industry to address the aforementioned deficiencies and inadequacies.

OBJECTS OF THE INVENTION

The primary object of the present invention is to provide a ubiquitous/smart computing system adapted for device discovery process, specifically the device capability negotiation process, and semantic analysis based on the device attributes.

Another object of the present invention is to provide a method and system for creation of generic device attributes (GDA) structure for the smart sensing devices which are heterogeneous in nature.

Another object of the present invention is to provide a method and system comprising a device manager of edge gateway system for creating a GDA for each sensing device(s), during device discovery process specifically while performing the device capability negotiation process.

Another object of the present invention is to provide a method and system for performing a semantic analysis on the value or content of generic device attributes (GDA) of sensing device(s) wherein the semantic analysis on the value or content of sensing device(s) results in the formation of device clusters categorization.

Yet another object of the present invention is to provide a method and system to reduce time and complexity in device prioritization and interoperation for desired type of interaction.

Yet another object of the present invention is to provide a method and system for performance enhancement in terms of facilitating device interoperation.

Yet another object of the present invention is to provide a method and system having generic device attributes (GDA) for providing a hierarchical structure of attributes for the smart sensing devices wherein the attributes are further divided into the sub attributes.

SUMMARY OF THE INVENTION

Before the present systems and methods, enablement are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application.

Embodiments of the present disclosure provide a system for optimizing time and complexity during an interoperation of at least two smart sensing devices operating in a heterogeneous environment, each of the at least two smart sensing devices being configured to at least one predetermined characteristic for the heterogeneous environment with a dynamic degree of prioritization in interoperation. Briefly described, in architecture, one embodiment of the system, among others, can be implemented as follows. An edge gateway has a memory and a processor, wherein the edge gateway comprises a device manager programmed to execute instructions on the processor for creating generic device attributes (GDA) of each of at least two smart sensing devices detected. A semantic analyzer is adapted for executing a semantic analysis on at least one value of the GDA. A cluster generator creates the cluster, the cluster generator adapted to derive a common means to interact with the at least two smart sensing devices under a single cluster, wherein at least two smart sensing devices in the single cluster are configured to interact with reduced latency. A classifier is adapted to form each cluster and assign the at least two smart sensing devices into classes, the at least two smart sensing devices in each class configured for quick prioritization while choosing an appropriate device of at least two smart sensing devices for a given type of interaction.

The present disclosure can also be viewed as providing methods for optimizing time and complexity during an interoperation of at least two smart sensing heterogeneous devices operating in a smart environment, wherein each of the at least two smart sensing heterogeneous devices is configured to at least one predetermined characteristic for the smart environment with a dynamic degree of prioritization in interoperation. In this regard, one embodiment of such a method, among others, can be broadly summarized by the following steps: negotiating device capability of each of the at least two smart sensing heterogeneous devices detected during the device discovery, wherein a negotiation is facilitated through a device manager of an edge gateway system communicatively coupled with the at least two smart sensing heterogeneous devices; creating a generic device attributes (GDA) structure of each of the at least two smart sensing heterogeneous device during device capability negotiation of device discovery; performing a semantic analysis on a quantity of content of the GDA structure of each of the at least two smart sensing heterogeneous devices by the device manager of the edge gateway system; generating a device cluster of the at least two smart sensing heterogeneous devices commensurate with a corresponding generic device attribute of each of the at least two smart sensing heterogeneous devices; and forming a plurality of classes by combining each generated device cluster, each of the plurality of classes facilitating quick prioritization while choosing a correct device of the at least two smart sensing heterogeneous devices for a given type of interaction, thereby facilitating device interoperation.

The present disclosure can also be viewed as providing computer-implemented methods for optimizing time and complexity during an interoperation of at least two smart sensing heterogeneous devices operating in a smart environment, wherein each of the at least two smart sensing heterogeneous devices is configured to at least one predetermined characteristic for the smart environment with a dynamic degree of prioritization in interoperation. In this regard, one embodiment of such a method, among others, can be broadly summarized by the following steps: negotiating device capability of each of the at least two smart sensing heterogeneous devices detected during the device discovery, wherein a negotiation is facilitated through a device manager of an edge gateway system communicatively coupled with the at least two smart sensing heterogeneous devices, the edge gateway system having a non-transient memory and a processor; executing instructions contained on the non-transient memory with the processor to create a generic device attributes (GDA) structure of each of the at least two smart sensing heterogeneous device during device capability negotiation of device discovery; performing a semantic analysis on a quantity of content of the GDA structure of each of the at least two smart sensing heterogeneous devices by the device manager on the processor of the edge gateway system; generating a device cluster of the at least two smart sensing heterogeneous devices commensurate with a corresponding generic device attribute of each of the at least two smart sensing heterogeneous devices; and forming a plurality of classes by combining each generated device cluster, each of the plurality of classes facilitating quick prioritization while choosing a correct device of the at least two smart sensing heterogeneous devices for a given type of interaction, thereby facilitating device interoperation.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF DRAWINGS

The foregoing summary, as well as the following detailed description of preferred embodiments, is better understood when read in conjunction with the appended drawings. For the purpose of illustrating the invention, there is shown in the present document example constructions of the invention; however, the invention is not limited to the specific methods and apparatus disclosed in the document and the drawing.

Figure 1:
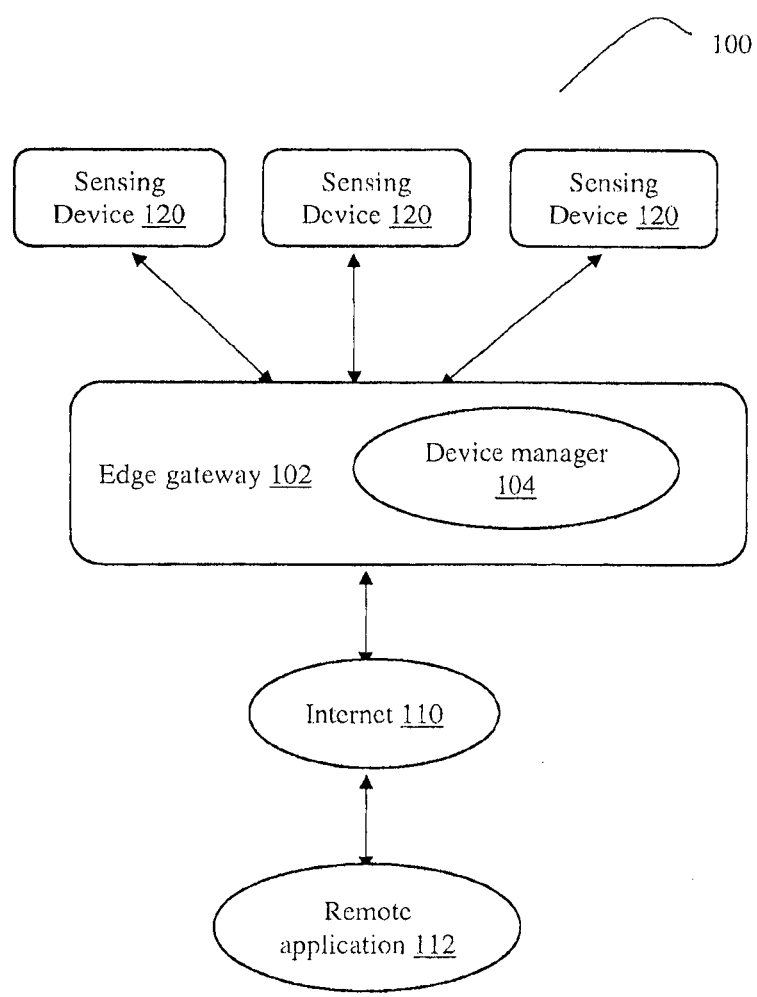
FIG. 1 illustrates the components of the system for optimizing time and complexity for device interoperation in accordance with an embodiment of the present invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE INVENTION

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described. The disclosed embodiments are merely exemplary of the invention, which may be embodied in various forms.

The present invention relates to the field of ubiquitous computing and Internet of Things. Particularly, this invention relates to the device discovery process, specifically the device capability negotiation process, and semantic analysis based on the device attributes.

The present invention further relates to creation of generic device attributes (GDA) for smart sensing devices by an edge gateway system during device discovery phase and at same time providing semantic analysis to optimize the device interoperation mechanism in any smart environment.

The present invention further relates to systems and methods for optimizing time and complexity during an interoperation of at least two smart sensing devices operating in a heterogeneous environment, each device is configured to predetermined characteristics for a heterogeneous environment with a dynamic degree of prioritization in interoperation.

Further exemplary methods for optimizing time and complexity during an interoperation of at least two smart sensing devices operating in a heterogeneous environment, the method comprising computer implemented steps of:

a) negotiating device capability of each detected device during the device discovery, each negotiation is facilitated through a device manager of an edge gateway system communicatively coupled with the devices;

b) creating a generic device attributes (GDA) structure of each device during device capability negotiation of device discovery;

c) performing a semantic analysis on the content of the generic device attributes (GDA) of each device by the device manager of the edge gateway system;

d) generating a cluster of devices commensurate with the corresponding generic device attribute of each device; and e) forming further classes by combining each identified device cluster/class, each class facilitating quick prioritization while choosing the right device for a given type of interaction thereby facilitating device interoperation.

Further exemplary system for optimizing time and complexity during an interoperation of at least two smart sensing heterogeneous devices' operating in a smart environment, the system comprising: an edge gateway comprising a device manager programmed to execute instructions for creating generic device attributes of each detected device; a semantic analyzer adapted to execute semantic analysis on the values of the device attributes generating cluster/class of sensing devices and assigns the devices various clusters/classes; a cluster generator adapted to cluster/classify the devices based on at least one detected common attribute, each device in a cluster/class are configured to interact with reduced latency; the devices in each class are configured for quick prioritization while choosing an appropriate device for a given type of interaction.

FIG. 1 illustrates the system architecture for optimizing time and complexity for device interoperation in accordance with an embodiment of the present invention.

Referring to FIG. 1, generic device attributes (GDA) formation system (100) for plurality of heterogeneous sensing devices (120) is shown. The system 100 comprises a group of heterogeneous sensing devices (120), an edge gateway (102), a device manager (104), an Internet (110) and a remote application (112).

The system (100) may include a variety of computerized and computer-compatible hardware and software components. For example, the system (100) may include a processor, an input/output (I/O) interface, and a memory. The processor may be implemented as one or more microprocessors, microcomputers, microcontrollers, digital signal processors, central processing units, state machines, logic circuitries, and/or any devices that manipulate signals based on operational instructions. Among other capabilities, the processor is configured to fetch and execute computer-readable instructions stored in the memory.

The I/O interface may include a variety of software and hardware interfaces, for example, a web interface, a graphical user interface, and the like. The I/O interface may allow the system (100) to interact with a user directly or through the devices. Further, the I/O interface may enable the system (100) to communicate with other computing devices, such as web servers and external data servers. The I/O interface may facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory may include modules and system data. The modules include routines, programs, objects, components, data structures, etc., which perform particular tasks or implement particular abstract data types. In one implementation, the modules may include a reception module, a displaying module, and other modules. The other modules may include programs or coded instructions that supplement applications and functions of the system (100).

In a preferred embodiment of the invention, the group of devices (120) consists of at least two smart sensing devices which are heterogeneous in nature, interoperating with each other and can sense the smart environment. The devices (120) are inbuilt with the sensors having different characteristics. The devices (120) can be used for detecting the light, motion, temperature, magnetic fields, gravity, humidity, moisture, vibration, pressure, electrical fields, sound, and other physical aspects of the external environment according to one exemplary embodiment of the invention.

In a preferred embodiment of the invention, the edge gateway (102) comprises a device manager (104). The edge gateway (102) is adapted for creation of the GDA 201 (as shown in FIG. 2) for smart sensing devices 120 which are heterogeneous in nature.

Figure 2:
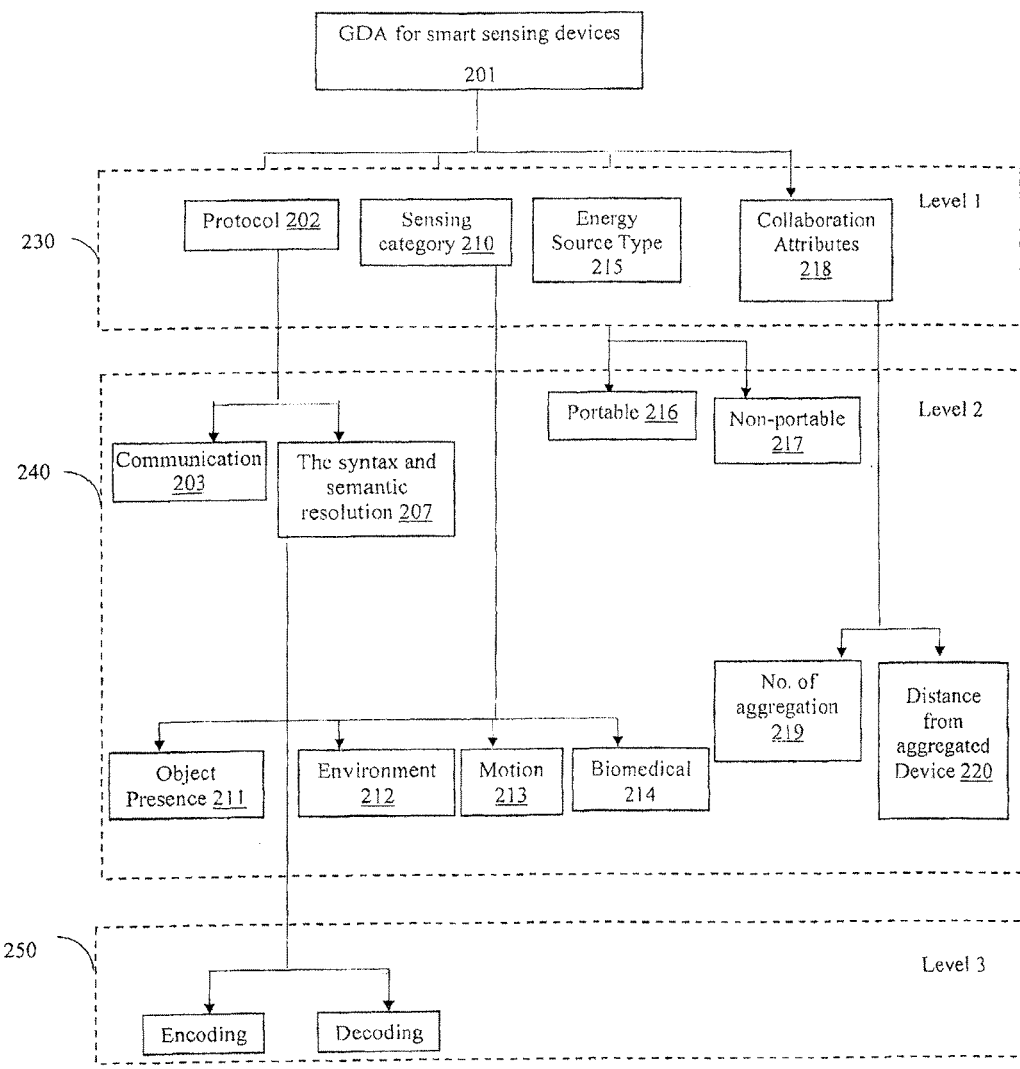
FIG. 2 illustrates the structure of generic device attributes in accordance with an embodiment of the present invention.

In a preferred embodiment of the invention, the edge gateway (102) is inbuilt with the device manger (104) adapted to form the GDA (201) structure (as shown in FIG. 2) during the device capability negotiation step as part of the device discovery phase and generates hierarchical layers of device clusters based on the semantic analysis on the attribute values of the GDA (201). The system (100) reduces the time and complexity in device prioritization and device interoperation for a required type of interaction.

In preferred embodiments, the device manager (104) performs semantic analysis on the content of the GDA (201) of the sensing devices (120) enabling the formation of device clusters/classes categorized by different level of hierarchy. The further classes of devices can be generated by combining the various device clusters/classes depending on the sensing attributes of the GDA (201).

In preferred embodiments, the device manager (104) further executes semantic analysis on the values of the device attributes to construct device clusters and further to form device classes of the heterogeneous sensing devices (120) at the edge. The system (100) adapted for performance enhancement in terms of facilitating device interoperation. The clustering of devices come up with a common means to interact with the devices under the same cluster having devices comprising common attributes. The classification further enables quick prioritization while choosing the right device for a given type of interaction.

In a preferred embodiments, a method of generating GDA (201) structure and performing semantic analysis on the content of the device attributes while performing the discovery and managing the devices by the device manager (104) of an edge gateway (102) interfacing the remote application (112) and the pool of sensing devices (120) at the edge of a smart environment is given.

In preferred embodiments, the top level device attributes can be expanded into layers of sub-attributes maintaining a tree-like data structure (as shown in FIG. 2). The semantic analysis on the values of the device attributes generates cluster/class of sensing devices 120 and assigns them further various classes. The analysis provides a faster way to interoperate with the sensing devices 120 which are heterogeneous in nature.

In preferred embodiments, an edge gateway (102) comprising the device manager (104) programmed to execute instructions for creating generic device attributes (201) of each detected device.

In preferred embodiments, a semantic analyzer adapted to executing a semantic analysis on the values of the device attributes generating cluster/class of sensing devices and assigns the devices further various classes.

In preferred embodiments, a cluster generator adapted to cluster/class to classify the devices based on at least one detected common attribute, each device in a cluster are configured to interact with reduced latency.

In preferred embodiments, further classes are formed by combining each identified device cluster/class, the devices in each class are configured for quick prioritization while choosing an appropriate device for a given type of interaction.

FIG. 2 illustrates the general structure of generic device attributes (GDA) in accordance with an embodiment of the present invention.

Referring to FIG. 2 illustrating general structure (200) of generic device attributes (GDA) (201). The GDA provides a hierarchical structure of attributes for the smart sensing devices 120.

According to exemplary embodiment of the invention the hierarchical structure can be further divided in different levels. In the present invention the levels are divided in Level 1 (230), Level 2 (240) and Level 3 (250) shown in FIG. 2. The level proposes various classes of attributes i.e. Level 1 (230) proposes a primary classes of attributes. Level 2 (240) proposes further division of the attributes and Level 3 (250) attributes corresponding to the primary class present an exemplary set and are not limited to list of sub attributes. The attributes may be extended further as per the need of the applications.

According to exemplary embodiment of the invention, the Level 1 considers protocol (202), sensing categories (210), energy source type (215) and collaboration attributes (218) as the primary class of attributes.

According to exemplary embodiment of the invention, the Level 2 considers communication (203), semantic and syntactic resolution (207) as the sub-attributes of the primary class protocol (202). The object presence (211), the environment (212), the motion (213) and the bio medical (214) as the sub-attributes of the primary class sensing categories (210). The portable (216) and non-portable (217) are sub-attributes of the energy source type (215). The number of aggregation (219) and distance from aggregated device (220) are sub-attributes of collaboration attributes (218).

According to exemplary embodiment of the invention, the Level 3 considers the exemplary set corresponding to their parents and are not limited to list of sub attributes, such as the communication (203) having the value of WIFI, ZIG-BEE, ETHERNET, BLUETOOTH etc. The syntax and semantic resolution (207) have different values for encoding and decoding. The environment (212) of the sensing category (210) has different values like time, location, temperature etc. and similarly the motion (213) of the sensing category (210) has different values like acceleration, angular displacement etc.

In preferred embodiment the GDA (201) forms a tree like hierarchical structure adapted to divide attributes in sub-attributes according to their characteristics as shown in FIG. 2. Further the device manager (104) performs semantic analysis on the content of the GDA (201) of the sensing devices (120). This results the formation of device clusters categorized by its different level of hierarchy. The further classes of devices can be generated by combining the various device clusters depending on the common sensing category of the GDA.

In preferred embodiment clustering of devices enables to come up with a common means to interact with the devices under the same cluster (since they have things common in their attributes) and this classification enables quick prioritization while choosing the right device for a given type of interaction. The solution provided by this invention also offers performance enhancement in terms of facilitating device interoperation.

Figure 3:
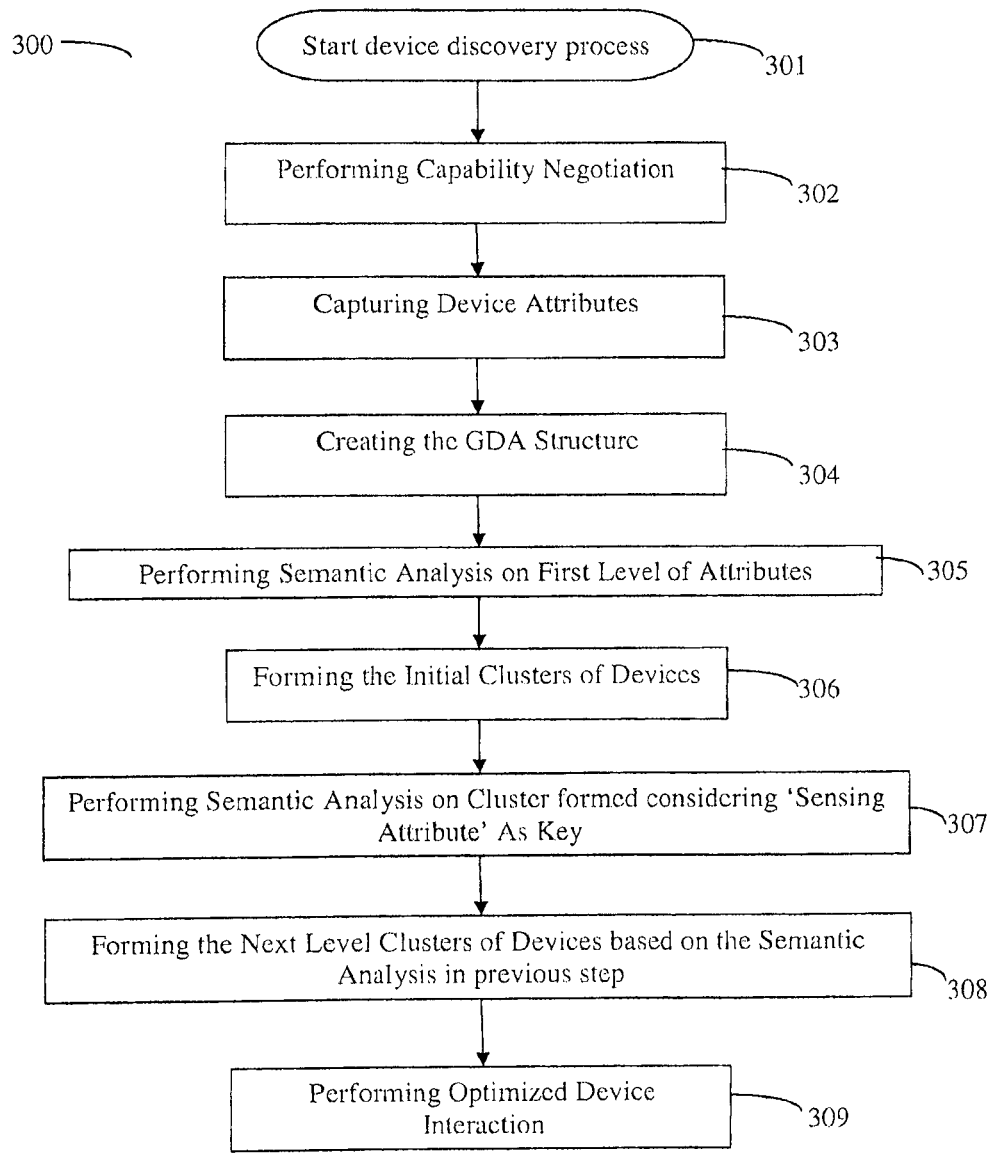
FIG. 3 illustrates flow chart for GDA structure formation and the cluster of device formation in accordance with an embodiment of the present invention.

FIG. 3 illustrates flow chart for GDA structure formation and the cluster/class of device formation in accordance with an embodiment of the present invention.

Referring to FIG. 3 the process starts at by discovering the devices which are present in smart environment in step 301. At the step 302, performing the capability negotiation according to characteristics of the devices. At the step 303, capturing of device attributes according to their characteristics. At the step 304, creating a generic device structure (GDA) of the attributes for each device. At the step 305, performing semantic analysis (S1) on the first level of attributes values. At the step 306, forming the initial cluster of devices according to cluster. At the step 307, performing the semantic analysis (S2) across the structure across the level 1 cluster considering 'sensing attributes' as the key. At the step 308, forming the next level of clusters of devices and at the step 309, performing device interoperation for required type of interaction.

Example Showing Best Mode

The present invention is supported by the following use case of a smart space—'smart irrigation and farming'.

According to exemplary embodiment, the system comprises smart sensors having different characteristics and adapted to interoperate with each other. For smart irrigation and farming system, the system comprises temperature, rainfall, humidity, solar radiation, soil moisture, location, time, presence of object (cattle) types of sensing parameters.

Let the different types of sensing devices be 1 temperature sensor (T), 1 rainfall sensor (R), 1 humidity sensors (H), 1 solar radiation sensor (SR), 2 soil moisture (SM) sensors from 2 different vendors with different semantic & syntactic encoding schemes, 1 location sensor (L) to specify the site location, 1 time sensor (t) to specify irrigation timing, object presence sensor of different categories—like remote monitoring camera (C) placed strategically and some presence detection sensor (P) to particularly reveal the identity of the object.

These sensors are discovered and managed by the edge gateway. Multiple applications part of this use case interacts with the edge gateway as per the system architecture shown in FIG. 1. There are multiple sensors from different vendors having same sensing category in a given area. Each sensor will have its own semantics (which may or may not be same with another sensor falling same sensing category).

According to exemplary embodiment, GDA structure formation and the cluster of device formation are presented as shown in FIG. 2 and flowchart in FIG. 3, respectively.

Forming the GDA Structure:

The table below is based on the structure of FIG. 2 for each sensing device.

| Device ID | Protocol Comm$_n$ | Sym & Syn | Sensing Category | Energy Source Portable | Non-portable | Collaboration # of aggregation | Distance from aggregated device |
|---|---|---|---|---|---|---|---|
| T | C1 | $S_{T1}$ | Environment: Value = Temperature | Yes | No | 0 | N/A |
| R | C1 | $S_{R1}$ | Environment: Rain | Yes | No | 0 | N/A |
| H | C2 | $S_{H1}$ | Environment: Humidity | Yes | | 0 | N/A |
| SR | C3 | $S_{SR1}$ | Environment: Solar Radiation | Yes | No | 0 | N/A |
| SM#1 | C2 | $S_{SM1}$ | Environment: Soil Moisture | No | Yes | 0 | N/A |
| SM#2 | C1 | $S_{SM2}$ | Environment: Soil Moisture | Yes | No | 0 | N/A |
| L | C2 | $S_L$ | Environment: Location | Yes | No | 0 | N/A |
| C#1 | C1 | $S_{C1}$ | Object Presence | Yes | No | 0 | N/A |
| C#2 | C2 | $S_{C2}$ | Object Presence | Yes | No | 0 | N/A |
| P | C4 | $S_{C2}$ | Object Presence | Yes | No | 0 | N/A |

Forming the Clusters:
Example of Semantic Functions $$A = SensingCategory \cdot Level3 attributes \cdot value + Protocol \cdot communation \cdot value - (T, C1) \quad (1)$$

$$B = A + Protocol \cdot Semantic\&syntactic\ resolution \cdot Value - (T, C1, ST1) \quad (2)$$

(2) Can be further divided in to

| (a) | (b) |
|---|---|
| C = B + Energy Source Type. Value (T, C1, ST1, 0) | D = B + Collaboration Attributes .value (T, C1, ST1, 0) |
| E = Energy Source Type. Value + Collaboration Attributes .value | |
| F = C + E (T, C1, ST1, 0, 0) | |

A, B, C, D, E, F presents the different semantic rules and functions and generates the respective device clusters. Considering the first row of the above table using temperature sensors the values of above clusters are shown.

Thus clustering of devices come up with a common means to interact with the devices under the same cluster (since they have things common in their attributes) and, also, this classification facilitates quick prioritization while choosing the right device for a given type of interaction. The solution provided by this invention also offers performance enhancement in terms of facilitating device interoperation.

The preceding description has been presented with reference to various embodiments. Persons skilled in the art and technology to which this application pertains will appreciate that alterations and changes in the described structures and methods of operation can be practiced without meaningfully departing from the principle, spirit and scope.

We claim:

1. A computer implemented method comprising:
negotiating device capability of each of at least two smart sensing heterogeneous devices detected during device discovery, wherein negotiating the device capability comprises negotiating the device capability through a device manager of an edge gateway system communicatively coupled to each of the at least two smart sensing heterogeneous devices;
creating a generic device attribute (GDA) structure of each of the at least two smart sensing heterogeneous devices during the negotiation, wherein creating the GDA structure comprises creating, for each of the at least two smart heterogeneous devices, a hierarchical structure of device attributes, the hierarchical structure comprising a tree data structure comprising a first level of GDAs and a second level of GDAs, wherein the second level of GDAs comprises sub-attributes of the first level of GDAs;
performing a semantic analysis of the GDA structure of each of the at least two smart sensing heterogeneous devices, wherein performing the semantic analysis comprises forming device clusters based on semantic rules, each of the semantic rules being associated with a GDA, each of the device clusters comprising smart sensing heterogeneous devices comprising a first common GDA corresponding to a first semantic rule;
forming a plurality of classes from the device clusters based on one or more semantic sub-rules, each of the one or more semantic sub-rules being associated with a specific GDA, each of the plurality of device classes comprising smart sensing heterogeneous devices comprising a second common GDA corresponding to a second semantic rule; and
interoperating the detected devices according to a priority schedule of the plurality of device classes, wherein a device having a higher priority class is operated before a device having a lower priority device class.

2. The method according to claim 1, wherein the at least two smart sensing heterogeneous devices further comprises at least two smart sensing heterogeneous devices adapted for measuring defined physical characteristics, of a smart environment.

3. The method according to claim 1, further comprising extracting information pertaining to the at least two smart sensing heterogeneous devices from a different location via the edge gateway system connected over the Internet.

4. The method according to claim 1, wherein at least one of the at least two smart sensing heterogeneous devices further comprises at least one of: a temperature sensor, a rainfall sensor, a humidity sensor, a solar radiation sensor, a soil moisture sensor, a location sensor, a time sensor, an object presence sensor.

5. A system comprising:
a memory storing instructions;
a processor communicatively coupled to the memory, wherein the processor is configured by the instructions to:
negotiate device capability of each of at least two smart sensing heterogeneous devices detected during device discovery, wherein negotiating the device capability comprises negotiating the device capability through a device manager of an edge gateway system communicatively coupled to each of the at least two smart sensing heterogeneous devices;
create a generic device attribute (GDA) structure of each of the at least two smart sensing heterogeneous devices during the negotiation, wherein creating the GDA structure comprises creating, for each of the at least two smart heterogeneous devices, a hierarchical structure of device attributes, the hierarchical structure comprising a tree data structure comprising a first level of GDAs and a second level of GDAs, wherein the second level of GDAs comprises sub-attributes of the first level of GDAs;
perform a semantic analysis of the GDA structure of each of the at least two smart sensing heterogeneous devices, wherein performing the semantic analysis comprises forming device clusters based on semantic rules, each of the semantic rules being associated with a GDA, each of the device clusters comprising smart sensing heterogeneous devices comprising a first common GDA corresponding to a first semantic rule;
form a plurality of device classes from the device clusters based on one or more semantic sub-rules, each of the one or more semantic sub-rules being associated with a specific GDA, each of the plurality of device classes comprising smart sensing heterogeneous devices comprising a second common GDA corresponding to a second semantic rule; and
interoperating the detected devices according to a priority schedule of the plurality of device classes, wherein a device having a higher priority device class is operated before a device having a lower priority device class.

6. The system of claim 5, wherein the first level of GDAs comprises protocol, sensing categories, energy source type, and collaboration.

7. The system of claim 6, wherein the second level of GDAs comprises:
communication, semantic and syntactic resolution as the sub-attributes of the protocol;
object presence, environment, motion, and bio medical as the sub-attributes of the sensing categories;
portable and non-portable as the sub-attributes of the energy source type; and
number of aggregation and distance from aggregated device as the sub-attributes of the collaboration.

8. The system of claim 7, wherein the tree data structure further comprising a third level of GDAs comprises sub-attributes of the second level of GDAs.

9. The system of claim 8, wherein the third level of GDAs comprises:
WiFi, Zigbee, Ethernet, and Bluetooth as the sub-attributes of the communication;
encoding and decoding as the sub-attributes of the syntax and semantic resolution;
time, location, and temperature as the sub-attributes of the environment; and
acceleration and angular displacement as the sub-attributes of the motion.

10. A non-transitory computer readable medium storing instructions which when executed by a possessor on a system, cause the processor to perform method comprising:
negotiating device capability of each of at least two smart sensing heterogeneous devices detected during device discovery, wherein negotiating the device capability comprises negotiating the device capability through a device manager of an edge gateway system communicatively coupled to each of the at least two smart sensing heterogeneous devices;
creating a generic device attribute (GDA) structure of each of the at least two smart sensing heterogeneous devices during the negotiation, wherein creating the GDA structure comprises creating, for each of the at least two smart heterogeneous devices, a hierarchical structure of device attributes, the hierarchical structure comprising a tree data structure comprising a first level of GDAs and a second level of GDAs, wherein the second level of GDAs comprises sub-attributes of the first level of GDAs;
performing a semantic analysis of the GDA structure of each of the at least two smart sensing heterogeneous devices, wherein performing the semantic analysis comprises forming device clusters based on semantic rules, each of the semantic rules being associated with a GDA, each of the device clusters comprising smart sensing heterogeneous devices comprising a first common GDA corresponding to a first semantic rule;
forming a plurality of device classes from the device clusters based on one or more semantic sub-rules, each of the one or more semantic sub-rules being associated with a specific GDA, each of the plurality of device classes comprising smart sensing heterogeneous devices comprising a second common GDA corresponding to a second semantic rule; and
interoperating the detected devices according to a priority schedule of the plurality of device classes, wherein a device having a higher priority device class is operated before a device having a lower priority device class.

11. The non-transitory computer readable medium of claim 10, wherein the at least two smart sensing heterogeneous devices further comprises at least two smart sensing heterogeneous devices adapted for measuring defined physical characteristics of a smart environment.

12. The non-transitory computer readable medium of claim 10, further comprising extracting information pertaining to the at least two smart sensing heterogeneous devices from a different location via the edge gateway system connected over the Internet.

13. The non-transitory computer readable medium of claim 10, wherein at least one of the at least two smart sensing heterogeneous devices further comprises at least one of: a temperature sensor, a rainfall sensor, a humidity sensor, a solar radiation sensor, a soil moisture sensor, a location sensor, a time sensor, an object presence sensor.

14. The non-transitory computer readable medium of claim 10, wherein the first level of GDAs comprises protocol, sensing categories, energy source type, and collaboration.

15. The non-transitory computer readable medium of claim 14, wherein the second level of GDAs comprises:
communication, semantic and syntactic resolution as the sub-attributes of the protocol;
object presence, environment, motion, and bio medical as the sub-attributes of the sensing categories;
portable and non-portable as the sub-attributes of the energy source type; and
number of aggregation and distance from aggregated device as the sub-attributes of the collaboration.

16. The non-transitory computer readable medium of claim 15, wherein the tree data structure further comprising a third level of GDAs comprises sub-attributes of a second level of GDAs.

17. The non-transitory computer readable medium of claim 16,
wherein the third level of GDAs comprises:
WiFi, Zigbee, Ethernet, and Bluetooth as the sub-attributes of the communication;
encoding and decoding as the sub-attributes of the syntax and semantic resolution;
time, location, and temperature as the sub-attributes of the environment; and
acceleration and angular displacement as the sub-attributes of the motion.

* * * * *